(12) United States Patent
Leiber et al.

(10) Patent No.: US 8,038,229 B2
(45) Date of Patent: Oct. 18, 2011

(54) BRAKE SYSTEM COMPRISING A CLUTCH SHIFTABLE BY THE BRAKE PEDAL FOR DISENGAGING THE DRIVE DEVICE FROM THE PISTON-CYLINDER UNIT

(75) Inventors: Heinz Leiber, Oberriexingen (DE);
Valentin Unterfrauner, Feldthurns (IT)

(73) Assignee: Ipgate AG, Zurich (CH)

( * ) Notice: Subject to any disclaimer, the term of this patent is extended or adjusted under 35 U.S.C. 154(b) by 0 days.

(21) Appl. No.: 12/742,197

(22) PCT Filed: Nov. 8, 2007

(86) PCT No.: PCT/EP2007/009683
§ 371 (c)(1),
(2), (4) Date: Jun. 1, 2010

(87) PCT Pub. No.: WO2009/059619
PCT Pub. Date: May 14, 2009

(65) Prior Publication Data
US 2010/0295364 A1    Nov. 25, 2010

(51) Int. Cl.
*B60T 8/44* (2006.01)
(52) U.S. Cl. ..................... 303/115.2; 303/114.1
(58) Field of Classification Search ......... 60/547.1–592; 188/349–362; 303/114.1, 114.3, 115.2
See application file for complete search history.

(56) References Cited

U.S. PATENT DOCUMENTS

| | | | |
|---|---|---|---|
| 4,395,883 A | 8/1983 | Melinat | |
| 4,918,921 A * | 4/1990 | Leigh-Monstevens et al. | 60/545 |
| 5,236,257 A * | 8/1993 | Monzaki et al. | 303/114.1 |
| 5,484,193 A * | 1/1996 | Fuller et al. | 303/113.1 |
| 2010/0026083 A1 * | 2/2010 | Leiber et al. | 303/3 |

FOREIGN PATENT DOCUMENTS

| | | | |
|---|---|---|---|
| DE | 3031643 A1 | | 4/1982 |
| DE | 102004050103 A1 | | 4/2006 |
| DE | 102005018649 | * | 10/2006 |
| FR | 2860474 A1 | | 4/2005 |
| WO | WO-2004/005095 A1 | | 1/2004 |
| WO | WO-2004/110840 A1 | | 12/2004 |

OTHER PUBLICATIONS

English language translation of the International Preliminary Report on Patentability issued in related International Application No. PCT/EP2007/009683 on Jun. 21, 2010.

* cited by examiner

*Primary Examiner* — Christopher Schwartz
(74) *Attorney, Agent, or Firm* — Connolly Bove Lodge & Hutz LLP

(57) ABSTRACT

The invention relates to a brake system, comprising at least one piston-cylinder unit for producing a pressure in at least one working chamber, the working chamber being connected to at least one wheel brake via at least one hydraulic line, and the brake system comprising at least one drive device and an actuating device, particularly in the form of a brake pedal, and the drive device during normal operation acting on the at least one first piston of the piston-cylinder unit for building pressure and reducing pressure by way of a first force transmission means, and in the event of failure of the drive device the actuating device acting mechanically on the piston by way of a second force transmission means, wherein the adjustment of the second force transmission means disengages the connection between the first force transmission means and the piston by means of the actuating device.

15 Claims, 3 Drawing Sheets

Figure 1:
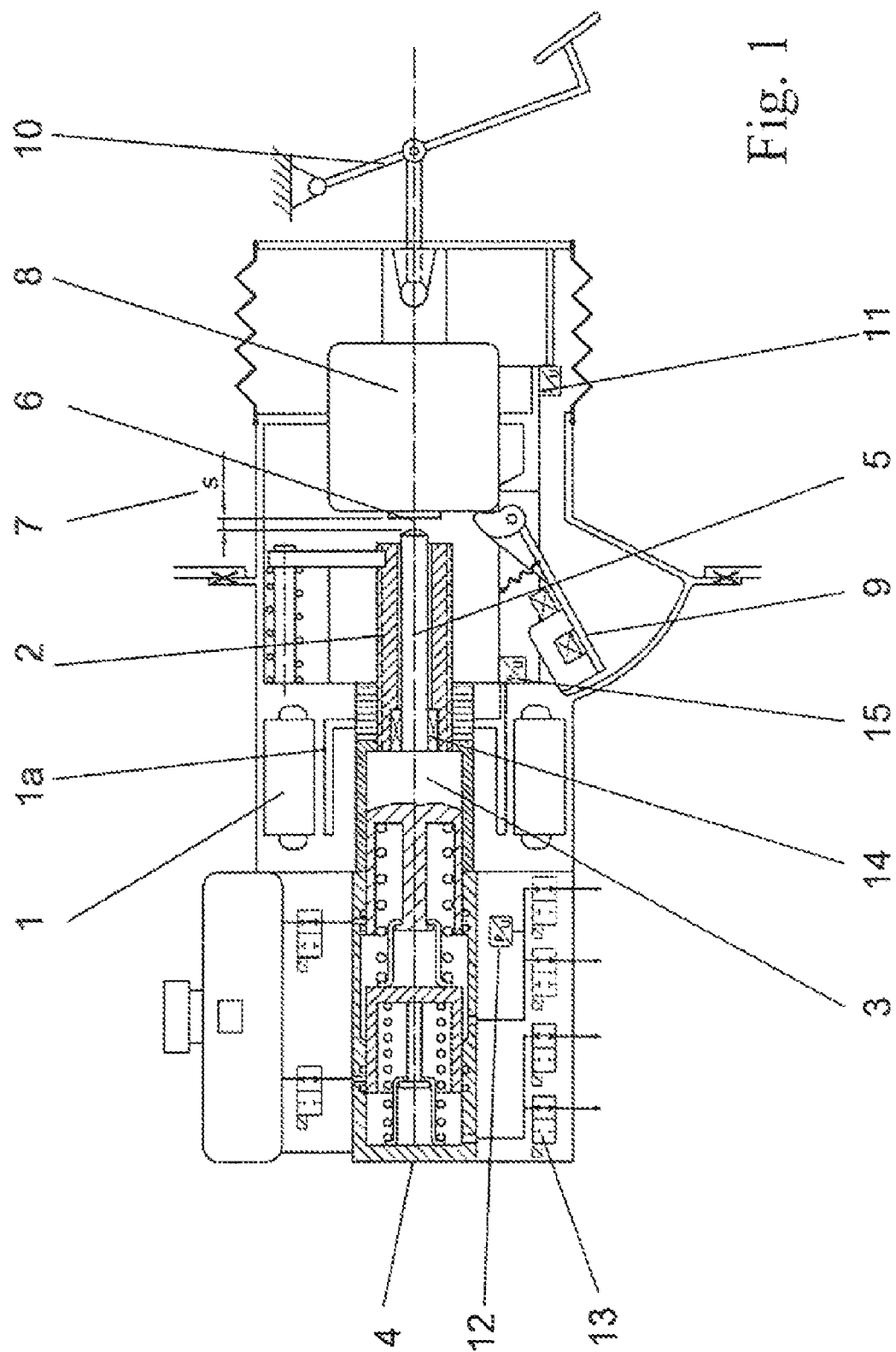

BRAKE SYSTEM COMPRISING A CLUTCH SHIFTABLE BY THE BRAKE PEDAL FOR DISENGAGING THE DRIVE DEVICE FROM THE PISTON-CYLINDER UNIT

CROSS-REFERENCE TO RELATED APPLICATION

This application is a 35 U.S.C. §371 National Stage Application of International Application No. PCT/EP2007/009683, filed Nov. 8, 2007, the entire contents of which is incorporated by reference herein.

The present invention relates to a brake system, comprising at least one piston-cylinder unit for producing a pressure in at least one working chamber, the working chamber being connected to at least one wheel brake via at least one hydraulic line, and the brake system comprising at least one drive device and an actuating device, particularly in the form of a brake pedal, and the drive device during normal operation acting on the at least one first piston of the piston-cylinder unit for building pressure and reducing pressure by way of a first force transmission means, and in the event of failure of the drive device the actuating device acting mechanically on the piston by way of a second force transmission means.

STATE OF THE ART

With brake systems there is a trend towards replacing the vacuum servo brake with a hydraulic or electromotive servo brake. A version of an electromotive servo brake is described in DE 10 2004 050 103 A1. Here the pressure modulation takes place in a separate unit. The electromotive boost is provided via a force sensor which via the electromotor with spindle drive delivers the desired boost to the piston. The spindle acts on the carrier in order to build pressure, damping elements being inserted between the spindle and the carrier. Return of the carrier takes place by means of the pressure forces of the main brake cylinder and its return spring (not shown). In the event of failure of the motor drive the brake pedal acts via the carrier directly on the piston.

In DE 10 2005 018 649 an electromotive servo brake is also described, which through corresponding piston control by means of selenoid valves apart from the servo braking also carries out the pressure modulation for ABS/ESP. Here the main brake cylinder piston is directly connected to the motor drive. This is necessary for rapid pressure building at low pressures, since here the return force from the brake pressure and springs is too low. In the event of failure of the motor a special clutch is provided for the spindle nut which in the event of such a motor failure releases this so that the pedal force can be exerted directly on the main brake cylinder piston through corresponding transmission members. This solution is expensive and requires a large installation space.

DE 10 2006 050 277 likewise provides for step or annular pistons for an electromotive servo brake. The outer piston is connected directly with the spindle drive and together with the motor brings about the servo braking and the pressure modulation. With this solution, in the event of failure of the motor drive, the inner piston with the transmission elements is likewise connected with the brake pedal, so that in this case sufficient braking effect can be achieved. The problem with this solution is the piston seal, in particular at small piston diameters which are precisely what are preferred for this system. In addition, the smaller piston, because of the smaller volume displacement is disadvantageous compared with larger so-called floating pistons, since at high brake pressures it comes up against the small piston and with differing brake pressures.

PROBLEM FOR THE INVENTION

The problem for the present invention is to provide a brake system in which, in the event of a failure of the drive unit a pressure in the brake cylinder by means of an actuating device, particularly in the form of a brake pedal, can be built independently of the drive unit.

SOLUTION TO THE PROBLEM

According to the invention this problem is solved by a brake system with the features of claim 1 and the features of the subclaims.

The invention is based on the concept of providing a first and a second force transmission means. Here the first force transmission means is driven by the drive device and in particular by an electromotive drive in the form of a spindle. The second force transmission means in the event of a failure of the actuating device, in particular in the form of a brake pedal, then moves and adjusts the piston, at the same time a decoupling of the form-fit that in normal operation exists between the first force transmission means and the piston takes place through the second force transmission means. In normal operation, in which the piston is adjusted by the drive device to build up or reduce pressure, according to the invention the form-fit between the piston and the first force transmission means is ensured through the second force transmission means, which is adjusted by the drive device along with the piston. If the drive fails and a braking effect is needed, through the brake pedal a force can be exerted on the second force transmission means, as a result of which this is adjusted relative to the piston and the first force transmission means in the direction of the piston against a spring resistance. Through this relative movement the security of the form-fit is removed. The form-fit is thus decoupled and the piston can through the second force transmission means be adjusted for pressure building free from the drive device.

In order that in normal operation the clutch remains engaged, that is to say that the form-fit is ensured, a spring pushes the second force transmission means into a first engaging position. In this position or relative position of the piston and the two force transmission means to each other, the coupling element is held securely in its form-fit creating position.

It is an advantage if the clutch described above is arranged in the immediate vicinity of the piston. It is particularly advantageous if the first and second force transmission means rest by their ends in a, particularly bowl-shaped recess of the piston, which is turned away from the working chamber of the piston-cylinder unit. Here at least one coupling element is supported so that it can shift radially to the cylinder axis on the piston or a part secured thereto, in particular a bush. Depending f the position of the two force transmission means relative to each other and to the piston, the coupling element is adjusted so that it either creates the form-fit between the piston and the first force transmission means or disengages the piston from the second force transmission means and thus from the drive.

Here the first force transmission means encompasses with its bowl-shaped face the bush, in which the at least one coupling element is supported, and which in turn is part of the piston or is secured to this. The free end of the second force transmission means is enclosed in the bush. A return spring is also arranged in the bush, and this pushes the second force transmission means into the first position ensuring the form-fit. Radial windows of the bush support at least one coupling element in a radially displaceable manner, which through guide curves of the two force transmission means is moveable in a recess of the respective other force transmission means. Roll barrels or balls are advantageously used here as coupling elements in order to minimise friction. The second force transmission means is encompassed in the first force transmission means in a moveable manner.

The recesses in the two force transmission means are in their simplest from annular grooves, the sides of the grooves being in the form of guide curves, so that where there is a relative movement the at least one coupling element is adjusted radially.

The use of roll barrels is very safe, cost-effective and compact. As a component of the push-rod and thus of the main brake cylinder these can be easily exchanged without the need to dismantle the entire unit. In addition the operation of the clutch when in service can be easily diagnosed by a comparison of the pedal position encoder and the pressure transducer when the motor is switched on and off.

In a preferred embodiment of the inventive brake system the first and/or second force transmission means is supported in a moveable and/or rotating manner on the piston or in a recess on the piston. Here the second force transmission means is in particular in the form of a rod and is supported in the second force transmission means in a moveable manner.

The invention is described in more detail in the following with the help of drawings.

Figure 2:
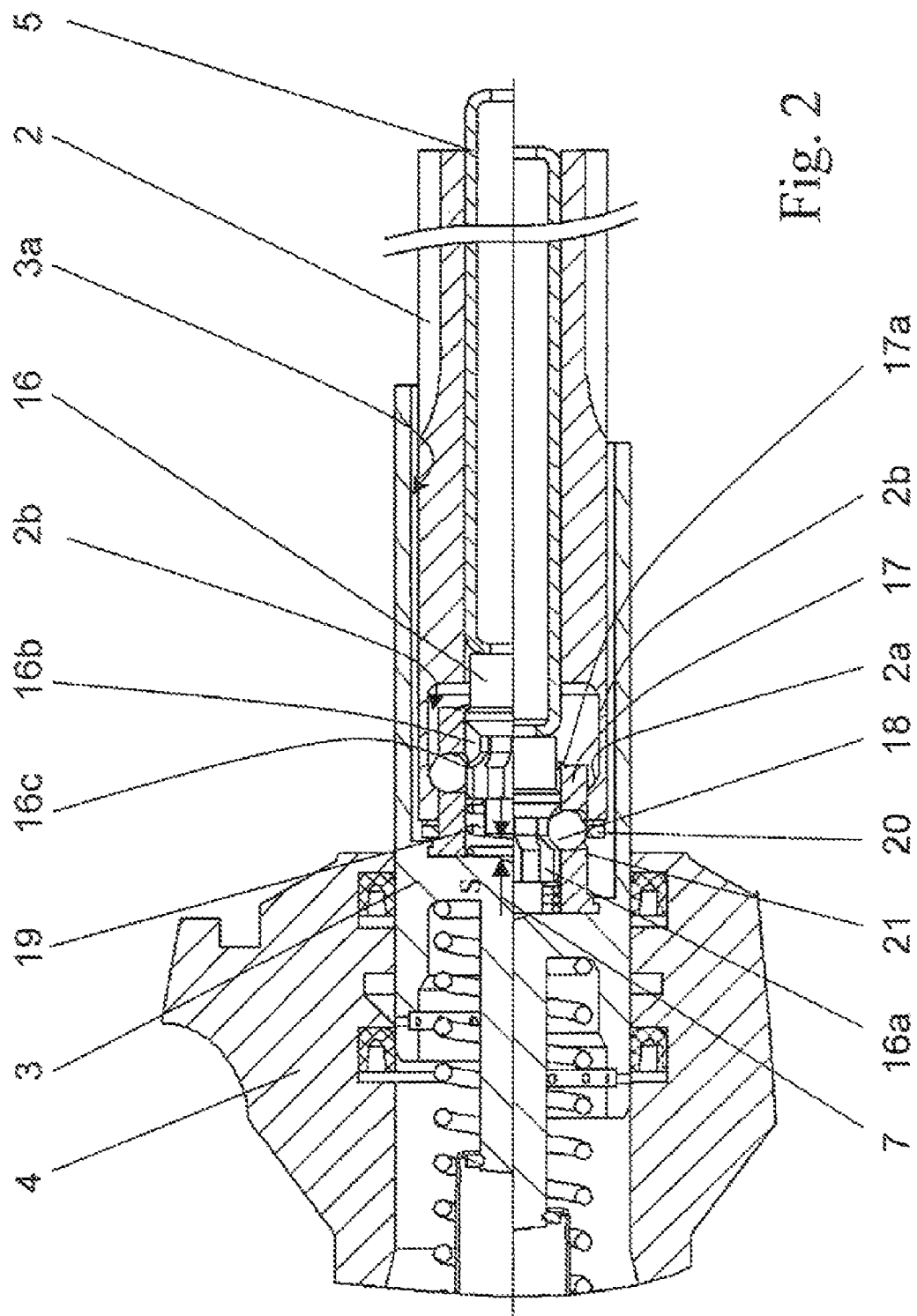
Figure 3:
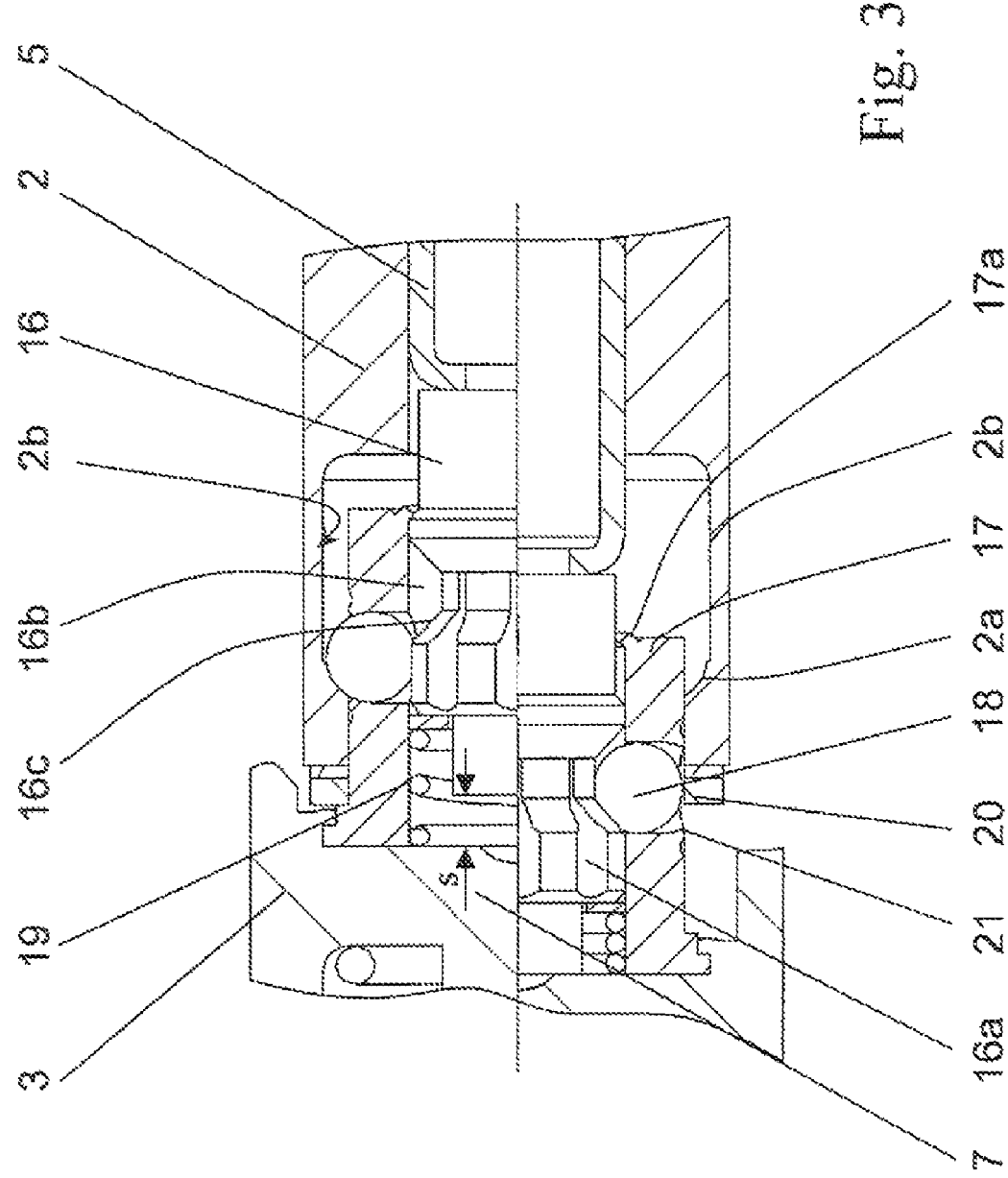

They show as follows:

FIG. 1: a schematic representation of the inventive brake system;

FIG. 2: an extract drawing of the part of the inventive brake system encompassing the clutch;

FIG. 3: a detailed representation of the inventive clutch.

FIG. 1 shows an integrated servo brake with an electric motor 1 with associated rotor 1a, which drives the spindle nut 2. The push-rod piston 3 is arranged in a moveable manner in the tandem main cylinder 4. The clutch 14 then acts between the piston 3 and the spindle 2 only if the drive 1 is intact. The clutch itself and the connection between piston 3, spindle 2 and the pedal plunger 5 which releases this or which in the event of a failure disengages the clutch is only shown schematically in FIG. 1 and is explained in detail using FIG. 2.

In normal operation, activation of the brake pedal 10 is detected via the pedal movement sensor 11 and via the motor 1 with spindle drive 5 of the push-rod piston 3 the building or reduction of pressure is caused. The function of pressure building and reduction is already sufficiently known from the documents described in this application as the state of the art. In this regard full reference is made to these documents. By means of the piston-cylinder unit 4 the pressure building and reduction is brought about with the valves 13 in multiplex mode for the individual wheel brakes (not shown) via the electromotor 1. Regulation takes place by means of a comparison between the sensor 15 and the pressure sensor 12. The pedal reaction is generated via the path simulator 8. In order that the pedal path is free from reaction of the pressure control piston 3, a small amount of free path s, as is also used in any vacuum servo brake, is used in order to take account of the slight start-up delay of the electromotor. The free path can also be created at least in part in the clutch 14 itself.

The path simulator 8 is integrated in housing 8 along with an adaptive non-working stroke circuit from DE 10 2006 059 840.7. If the electromotor 1 is intact, this moveable housing is blocked from moving by the electromagnetic path simulator lock 9. In the event of failure of the drive 1 the brake pedal 10 with known transmission element and coupling element 6 acts on the pedal plunger 5 and this in turn via the clutch 14 on the pressure control piston 3.

The spindle 2 is also understood to be the first force transmission means, via which from the drive 1 a force can be transferred to the piston 3 both for pressure building (the piston is displaced to the left), and for pressure reduction, the piston also being displaced to the left.

The pedal plunger is also understood to be the second face transmission means, via which a force can be transferred from the brake pedal 10 to the piston 3. In this way the pedal movement acts directly on the tandem main cylinder 4.

Through the path simulator 7 and the non-working stroke s, when the motor is intact the pedal movement is disengaged from the piston movement.

Pressure modulation for ABS/ESP takes place by corresponding motor control and piston movement in so-called multiplex mode, in which the control valves 13 are switched alternately according to the necessary pressure level in relation to the control algorithm to pressure building, reduction or maintenance. The pressure sensor allows the corresponding pressure level to be detected.

Since the clutch is only shifted in emergency mode, which as a rule rarely arises, but the operation of which is crucial in the event of malfunction, it is recommended that the ability of the clutch to shift is diagnosed in order to exclude any possibility of jamming. A diagnosis of the clutch 14 can be carried out, inter alia, for example if when the vehicle is stated up or during vehicle acceleration phases of the electromotor 1 the spindle 2 moves from the starting position shown in FIG. 2 in the direction of the passenger compartment in the opposite direction to the pedal stroke direction, that is to say to the right. Since the pedal in the direction of the driver has a stop, not shown, the immobilised pedal plunger 5 immobilised as a result plunges into the spindle 2 and displaces the clutch plunger 16 relative to the spindle 2. If the clutch 14 is operating perfectly it is opened in the manner described and the motor can displace the spindle 2 further than the free path s available in the clutch. The spindle travel can be detected via the angle sensor 15. If the clutch 14 should jam, the spindle after returning through the free travel s comes up against the stop and the motor current increases correspondingly sharply.

FIG. 2 shows the coupling of the spindle 2 with the piston 3. The clutch 14 is integrated into an in particular bowl-shaped recess 3a of the push-rod piston 3 arranged on the face turned away from the working chambers of the tandem main brake cylinder 4. The basic elements of the main brake cylinder 4 will not be described as theses are generally known. The piston 3 has a form-fit connection with the spherical bushing 17, which incorporates several balls 18 or if necessary cylindrical roll bodies.

Within the bushing 17 the clutch plunger 16 is supported, which is connected with the end of the pedal plunger 5. The clutch plunger 16 is returned via a spring 19 to a stop 17a of spherical bushing to an initial position. The top half of the drawing shows the clutch 14 in the engaged state. The spindle 2 acts to build pressure via compensating discs 20 directly on the piston 3. During pressure reduction the spindle 2 acts via a hemispherical head 2a on the balls 18, the inward radial movement of which is prevented by corresponding ball tracks 16a in the clutch plunger 16. The ball tracks 16a thus act as blocking surfaces, which prevent the opening of the clutch if pressure is applied to the pedal plunger other than through the brake pedal 10. In this way in normal operation a form-fit between spindle 2 and piston 3 is achieved, which allows a rapid return of the piston 3 for pressure reduction by means of the electromotor 1. In normal operation no force is transmitted to the pedal plunger 5 by the described construction of the path simulator with stop 9.

If, as described, the motor drive fails, through the movement of the housing 8 with the brake pedal 10 the pedal plunger 5 moves, which in turn acts on the clutch plunger 16. After travelling the free path 7 and compressing the spring 19 the clutch plunger 14 acts on the piston 3. This takes the spherical bushing 17 with it, as a result of which the balls 18 via the hemispherical head or guide curve 2a are pushed inwards into the recess 16b of the clutch plunger 16. This breaks the form-fit between piston 3 and spindle 2 and the clutch is open. The piston 2 can now be adjusted independently of the drive via the brake pedal for pressure building. In the spherical bushing 16 inserts 21 are created in order that the balls do not fall out when the cylinder 4 is assembled or stripped out.

The contact surfaces between spindle 2 and ball 18 or ball and clutch plunger 16 have a hemispherical shape, so that linear contact takes place and the surface pressures are correspondingly reduced.

The clutch plunger 16 is secured against rotation to the spherical bushing 17. To this end the ball tracks 16a are preferably designed in such a way that they protrude into the recesses 16b, such that the clutch is no longer operative.

FIG. 3 shows an enlarged extract drawing showing the parts essential to the clutch.

LIST OF REFERENCES

1 Electromotor
1a Rotor with spindle nut
2 Spindle
2a Guide curve or hemispherical head
2b Recess
3 Pressure control piston
3a Bowl-shaped recess
4 Tandem main brake cylinder
5 Pedal plunger
6 Coupling element with brake pedal
7 Free path
8 Path simulator with adaptive free travel shifting
9 Path simulator stop
10 Brake pedal
11 Pedal movement sensor
12 Pressure sensor
13 Control valves
14 Clutch
15 Rotational angle sensor
16 Clutch plunger
16a Ball tracks
16b Recess
16c Guide curve
17 Spherical bushing
17a Stop in spherical bushing
18 Ball
19 Return spring
20 Compensating discs
21 Inset

The invention claimed is:

1. A brake system, comprising at least one piston-cylinder unit for producing a pressure in at least one working chamber, the working chamber being connected to at least one wheel brake via at least one hydraulic line, and the brake system comprising at least one drive device and an actuating device, and wherein the drive device during normal operation is configured to act on the at least one first piston of the piston-cylinder unit for building pressure and reducing pressure by way of a first force transmission means, and in the event of failure of the drive device the actuating device is configured to act mechanically on the piston by way of a second force transmission means, wherein adjustment of the second force transmission means disengages a connection between the first force transmission means and the piston by means of the actuating device, the system further comprising a clutch arranged between the piston and the first force transmission means, wherein the second force transmission means is configured to operate the clutch.

2. The brake system according to claim 1, wherein in normal operation the first force transmission means is configured for exerting a force on the piston directed along the cylinder axis, and has said connection with the piston.

3. The brake system according to claim 2, wherein the second force transmission means is configured to separate the connection in the event of failure.

4. The brake system according to claim 3, wherein the second force transmission means is configured to separate the connection in the event of failure by releasing a stop means.

5. The brake system according to claim 1, wherein the first and/or the second force transmission means can be shifted and/or rotated on the piston or is/are supported in a recess of the piston, and wherein the second force transmission means is forced by means of the pressure of a spring in the direction of a first position and actuating device and can be adjusted against the spring pressure to a second position relative to the piston, wherein in the first position the second force transmission means is configured to ensure the connection between first force transmission means and piston, and wherein in the second position or an area between the first and second position, the second force transmission means is configured to separate or release the connection, wherein in the first position at least one coupling element is supported by the piston and is held by the second force transmission means at least partially in a recess of the first force transmission means to create a form-fit.

6. The brake system according to claim 5, wherein in the second position the at least one coupling element is enclosed in a recess of the second force transmission means and does not create a form-fit between the first force transmission means and piston, wherein the at least one coupling element is enclosed in a radially moveable manner in a spherical bushing formed on or secured to the piston.

7. The brake system according to claim 6, wherein the first and second force transmission means have guide curves, which when the first or second force transmission means moves relative to the support part, are adapted to push the at least one coupling element out from its own recess and into the recess of the respective other force transmission means.

8. The brake system according to claim 1, wherein the second force transmission means comprises a clutch plunger against the piston and wherein the spherical bushing is secured against rotation particularly by means of a form-fit.

9. The brake system according to claim 8, wherein the securing against rotation takes place by at least one ball track, which extends into a respective adjacent recess.

10. A method for testing the operation of the brake system according to claim 1, comprising comparing possible pedal and spindle travel by adjusting the piston to test operation of the clutch.

11. The method according to claim 10, wherein the operation of the clutch is diagnosed in that the first force transmission means is moved into the starting position by the drive device against the immobilised second force transmission means, so that this operates a clutch plunger relative to the first force transmission means and thereby disengages the clutch, serviceability of the clutch being determined if the first force transmission means can be moved further than a coupling path.

12. The brake system according to claim 1, wherein the piston can be moved back and forth by the drive device in the cylinder, and wherein in the event of a failure of the drive device a movement forced by the actuating device of the second force transmission means relative to the piston, particularly towards the piston, open the clutch and the piston by means of the actuating device, and wherein the second force transmission means is adjustable for building pressure independently of the drive device.

13. The brake system according to claim 1, wherein between the actuating device and the second force transmission means a path simulator is arranged, a pedal travel limitation of which particularly can be switched off by means of a device.

14. The brake system according to claim 1, wherein between each working chamber and the associated at least one wheel brake, one or more 2/2-directional control valves are arranged.

15. The brake system according to claim 1, wherein through corresponding triggering of the drive device the brake system sets necessary servo braking and pressure modulation for ABS and/or ESP function.

* * * * *